US012583312B2

(12) United States Patent
Tsai

(10) Patent No.: US 12,583,312 B2
(45) Date of Patent: Mar. 24, 2026

(54) ACTUATOR FOR ACTIVE GRILLE SHUTTLE

(71) Applicant: FORTRESS AUTO INTERNATIONAL LTD., Taoyuan City (TW)

(72) Inventor: Kuo-Hui Tsai, Taoyuan City (TW)

(73) Assignee: FORTRESS AUTO INTERNATIONAL LTD.

( * ) Notice: Subject to any disclaimer, the term of this patent is extended or adjusted under 35 U.S.C. 154(b) by 0 days.

(21) Appl. No.: 18/515,137

(22) Filed: Nov. 20, 2023

(65) Prior Publication Data

US 2025/0162402 A1     May 22, 2025

(51) Int. Cl.
*B60K 11/08*          (2006.01)
*F16H 37/12*          (2006.01)
*F16H 57/02*          (2012.01)
*F16H 57/031*         (2012.01)

(52) U.S. Cl.
CPC .......... B60K 11/085 (2013.01); F16H 37/122 (2013.01); F16H 57/031 (2013.01); *F16H 2057/02026* (2013.01); *F16H 2057/02034* (2013.01); *F16H 2057/02082* (2013.01)

(58) Field of Classification Search
CPC . F16H 2057/02026; F16H 2057/02034; B60K 11/085
See application file for complete search history.

(56) References Cited

U.S. PATENT DOCUMENTS

| | | | | | |
|---|---|---|---|---|---|
| 10,876,595 | B2 * | 12/2020 | Sugiyama | .............. | H02K 7/116 |
| 2013/0086839 | A1 * | 4/2013 | Klop | .................... | B60K 11/085 |
| | | | | | 49/506 |
| 2013/0275009 | A1 * | 10/2013 | Sakai | ................... | B60K 11/085 |
| | | | | | 701/49 |
| 2015/0136500 | A1 * | 5/2015 | Boom | .................... | B60K 11/06 |
| | | | | | 180/68.1 |
| 2019/0252944 | A1 * | 8/2019 | Watrin | ................... | H02K 5/225 |
| 2020/0223417 | A1 * | 7/2020 | Otto | ...................... | B60T 13/746 |
| 2021/0152049 | A1 * | 5/2021 | Watrin | ................... | H02K 7/116 |

* cited by examiner

*Primary Examiner* — Minnah L Seoh
*Assistant Examiner* — Gregory T Prather
(74) *Attorney, Agent, or Firm* — Chih Feng Yeh; Yongjean Consulting Inc.

(57)          ABSTRACT

An actuator for an active grille shuttle is disclosed. Linkage rods of the active grille shuttle are interlocked and screwed with an output shaft to drive the active grille shuttle, to solve a conventional technical problem that opening and closing control accuracy of the active grille shuttle is gradually reduced over time because an output shaft of a conventional actuator and linkage rods of an active grille shuttle are worn after long-term use when the linkage rods are mounted with the output shaft of the conventional actuator by fitting shapes. Compared with the conventional actuator, the output shaft of the disclosed actuator and the linkage rods of the active grille shuttle are not worn due to long-term use, so as to achieve the effect of improving accuracy and stability of the opening and closing control of the active grille shuttle.

6 Claims, 7 Drawing Sheets

1

ACTUATOR FOR ACTIVE GRILLE SHUTTLE

BACKGROUND

1. Technical Field

The invention is related to an actuator, and more particularly to an actuator in which a linkage rod of an active grille shuttle is screwed with an output shaft, thereby improving accuracy and stability of the opening and closing control of the active grille shuttle.

2. Related Art

A conventional grille shuttle is always in an open state, that is, it does not have a function of opening and closing grilles, so when the vehicle is just started to drive, the air cools the water tank, which is not very hot, and it causes that the water temperature rises slowly and the engine is unable to quickly reach a better operating temperature. In order to solve this problem, an active grille shuttle with an opening and closing function was developed, and this active grille shuttle is able to change the opening and closing of the grilles to control the air intake volume and wind resistance, so as to improve the engine's efficiency in a better operating temperature and improve the engine's fuel usage efficiency.

In order to solve the above problems, the active grille shuttle was developed to control the opening and closing of the grilles through an actuator, an output shaft of the actuator and a linkage rod of the active grille shuttle are mounted with each other in corresponding matching shapes, but the output shaft of the actuator and the linkage rod of the active grille shuttle are worn after long-term use, and it may gradually decrease the control accuracy of controlling the opening and closing of the active grille shuttle over time.

Therefore, what is needed is to develop an improved solution to solve the above-mentioned conventional problem that the opening and closing control accuracy of an active grille shuttle is gradually reduced over time because an output shaft of an actuator wears out in long-term use.

SUMMARY

An objective of the present invention is to disclose an actuator for an active grille shuttle, to solve the conventional problem that the opening and closing control accuracy of an active grille shuttle is gradually reduced over time because an output shaft of an actuator wears out in long-term use.

In order to achieve the objective, the present invention provides an actuator for active grille shuttle including a chassis, a motor, a control circuit board, a first gear, a second gear, a third gear, an output shaft component and a lid.

The chassis includes external connecting parts, a first output shaft hole, and an accommodation space. The motor is disposed in the accommodation space, and has a motor rotor provided to connect and fix a motor gear. The control circuit board includes an external port, wherein the control circuit board is electrically connected to and disposed on the motor, multiple pins of the external port are inserted through the external connecting parts, and the control circuit board receives a control instruction from an external in-vehicle computer, to control the motor to rotate. The first gear is disposed in the accommodation space, and comprising first shaft teeth and first gear teeth, wherein the first gear teeth are engaged with the motor gear. The second gear is disposed in the accommodation space, and comprising second shaft teeth and second gear teeth, wherein the second gear teeth is engaged with the first shaft teeth. The third gear is disposed in the accommodation space, and comprising third shaft teeth and third gear teeth, wherein the third gear teeth are engaged with the second shaft teeth. The output shaft component is disposed in the accommodation space, and comprising output gear teeth and an output shaft, wherein the output gear teeth are engaged with the third shaft teeth, each of two ends of the output shaft has a thread disposed thereon, and interior of a shaft of the output shaft has a specific geometrical shape. The lid includes a second output shaft hole, wherein the lid is configured to cover the chassis to enclose the motor, the control circuit board, the first gear, the second gear, the third gear and the output shaft component in the accommodation space, and the output shaft is inserted through the first output shaft hole and the second output shaft hole to expose out of the chassis and the lid. The active grille shuttle includes two grille shuttles, each of the two grille shuttles is linked with a linkage rod corresponding thereto, a mounting end of each of the linkage rods has a shape corresponding in geometrical shape to interior of the shaft of the output shaft, each of the linkage rods of the active grille shuttle is interlocked with an end of the output shaft based on the shape of the mounting end and the shape of interior of the shaft of the output shaft, and then each of the linkage rods of the active grille shuttle and the end of the output shaft are screwed through the thread on the end of the output shaft, wherein when the actuator drives the output shaft component to rotate through the motor, the first gear, the second gear, and the third gear, the grille shuttles on two sides of the active grille shuttle are driven at the same time to act, to adjust opening magnitudes of the grille shuttles on two sides of the active grille shuttle or close the grille shuttles on two sides of the active grille shuttle.

According to the above-mentioned actuator of the present invention, the linkage rods of the active grille shuttle are interlocked and screwed with the output shaft to drive the active grille shuttle, to solve a conventional technical problem that opening and closing control accuracy of the active grille shuttle is gradually reduced over time because an output shaft of an conventional actuator and the linkage rods of an active grille shuttle are worn after long-term use when the linkage rods are mounted with the output shaft of the conventional actuator by fitting shapes. Compared with the conventional actuator, the output shaft of the actuator of the present invention and the linkage rods of the active grille shuttle are not worn due to long-term use, so as to achieve the effect of improving accuracy and stability of the opening and closing control of the active grille shuttle.

Therefore, the technical solution of the present invention is able to achieve the effect of improving accuracy and stability of the opening and closing control of the active grille shuttle.

BRIEF DESCRIPTION OF THE DRAWINGS

The structure, operating principle and effects of the present invention will be described in detail by way of various embodiments which are illustrated in the accompanying drawings.

DETAILED DESCRIPTION OF EMBODIMENTS

Figure 1:
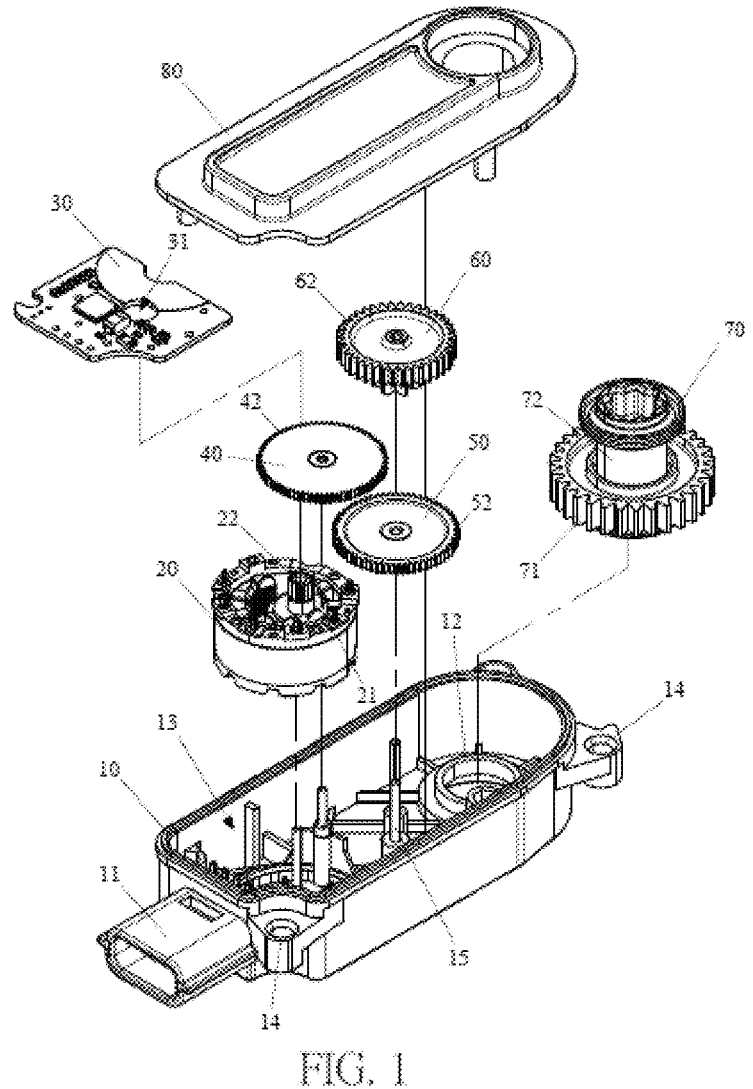
FIG. 1 is a perspective exploded view of an actuator for an active grille shuttle, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

An actuator for active grille shuttle of the present invention will be illustrated in the following paragraphs. Please refer to FIG. 1, which is a perspective exploded view of an actuator for an active grille shuttle, according to the present invention.

The actuator 100 includes a chassis 10, a motor 20, a control circuit board 30, a first gear 40, a second gear 50, a third gear 60, an output shaft component 70, and a lid 80.

Figure 2:
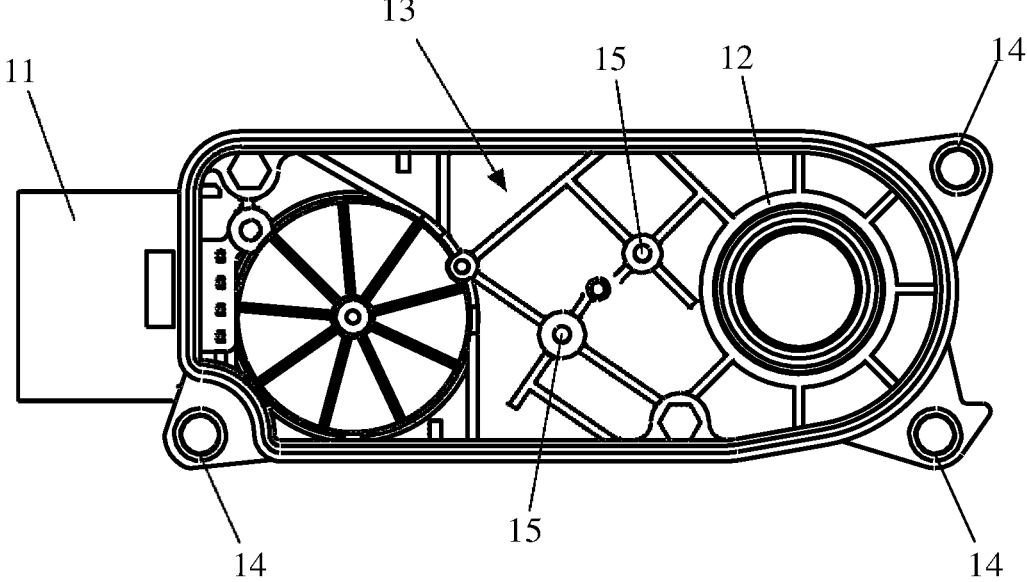
FIG. 2 is a plan view of a chassis of an actuator for an active grille shuttle, according to the present invention.

The chassis 10 of the actuator 100 includes external connecting parts 11, a first output shaft hole 12, and an accommodation space 13, as shown in FIG. 2. FIG. 2 is a plan view of a chassis of an actuator for an active grille shuttle, according to the present invention. The chassis 10 has multiple fastening parts 14 disposed on an outer surface thereof, and the actuator 100 is engaged with the active grille shuttle through the fastening parts 14; however, this example is merely for exemplary illustration, and the application field of the present invention is not limited to the example.

Multiple gear shafts 15 are disposed in the accommodation space 13 of the chassis 10, each of the first gear 40, the second gear 50 and the third gear 60 is inserted through a corresponding one of the multiple gear shafts 15, so that the first gear 40, the second gear 50, and the third gear 60 are disposed in the accommodation space 13 of the chassis 10.

The motor 20 is disposed in the accommodation space 13 of the chassis 10, and has a motor rotor 21 connected to and fastened with a motor gear 22. In an embodiment, the motor 20 can be a multiphase motor, but this example is merely for exemplary illustration, and the application field of the present invention is not limited to the example. It should be noted that, in an embodiment of the present invention, a modulus of the motor gear 22 can be 0.3 and the number of teeth of the motor gear 22 can be 13, an addendum circle of the motor gear 22 can be 4.5 mm, a tooth thickness of the motor gear 22 can be 3.6 mm; however, these examples are merely for exemplary illustration, and the application field of the present invention is not limited to these examples.

The control circuit board 30 includes an external port, the control circuit board 30 is electrically connected to the motor 20 and disposed on the motor 20, and multiple pins of the external port are inserted through the external connecting parts 11 of the chassis 10. The control circuit board 30 receives a control instruction from an external in-vehicle computer to control the motor to rotate. It should be noted that, in order to prevent from blocking the motor gear 22, in consideration of a shape and a size of the control circuit board 30, the control circuit board 30 can have a hole 31 corresponding in position to the motor gear 22, so that the motor gear 22 can pass through the control circuit board 30 through the hole 31.

Figure 3A:
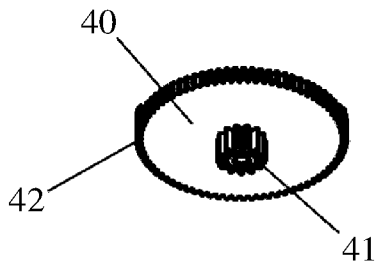
FIG. 3A is a perspective view of a first gear for an active grille shuttle, according to the present invention.

The first gear 40 is disposed in the accommodation space 13 of the chassis 10. The first gear teeth 40 include first shaft teeth 41 and first gear teeth 42, and the first gear teeth 42 are engaged with the motor gear 22, as shown in FIG. 3A. FIG. 3A is a perspective view of a first gear for an active grille shuttle of the present invention. It should be noted that, in an embodiment of the present invention, a modulus of the first shaft teeth 41 is 0.35, the number of the teeth of a first shaft teeth 41 is 13, an addendum circle of the first shaft teeth 41 is 5.39 mm, and a tooth thickness of each of the first shaft teeth 41 is 3 mm. In a preferred embodiment of the first gear 40 of the present invention, the modulus of the first gear teeth 42 can be 0.3, the number of teeth of the first gear teeth 42 can be 77, the addendum circle of the first gear teeth 42 is 23.52 mm, a tooth thickness of each of the first gear teeth 42 is 1.5 mm; however, these examples are merely for exemplary illustration, and the application field of the present invention is not limited to these examples.

Figure 3B:
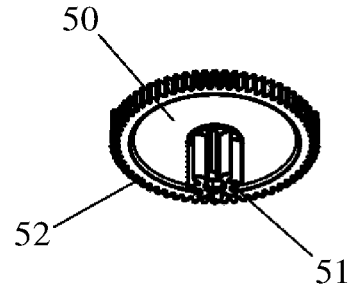
FIG. 3B is a perspective view of a second gear for an active grille shuttle, according to the present invention.

The second gear 50 is disposed in the accommodation space 13 of the chassis 10, and includes second shaft teeth 51 and second gear teeth 52. The second gear teeth 52 are engaged with the first shaft teeth 41, as shown in FIG. 3B. FIG. 3B is a perspective view of a second gear for an active grille shuttle of the present invention. It should be noted that, in an embodiment of second gear 50 of the present invention, a modulus of the second shaft teeth 51 can be 0.4, the number of teeth of the second shaft teeth 51 can be 11, an addendum circle of the second shaft teeth 51 can be 5.44 mm, a tooth thickness of each of the second shaft teeth 51 can be 6.7 mm; in an preferred embodiment of second gear 50 of the present invention, the modulus of the second gear teeth 52 can be 0.35, the number of teeth of the second gear teeth 52 can be 64, the addendum circle of the second gear teeth 52 can be 23 mm, and the tooth thickness of each of the second gear teeth 52 is 1.8 mm; however, these examples are merely for exemplary illustration, and the application field of the present invention is not limited to these examples.

Figure 3C:
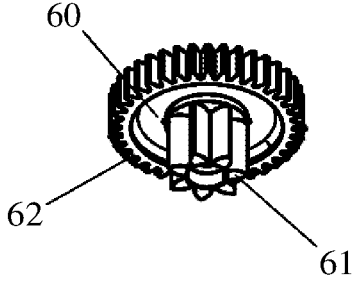
FIG. 3C is a perspective view of a third gear for an active grille shuttle, according to the present invention.

The third gear 60 is disposed in the accommodation space 13 of the chassis 10, and includes third shaft teeth 61 and third gear teeth 62. The third gear teeth 62 are engaged with the second shaft teeth 51, as shown in FIG. 3C. FIG. 3C is a perspective view of a third gear for an active grille shuttle of the present invention. It should be noted that, in an embodiment of the present invention, a modulus of the third shaft teeth 61 is 0.6, the number of teeth of the third shaft teeth 61 is 11, an addendum circle of the third shaft teeth 61 is 8.52 mm, a tooth thickness of each of the third shaft teeth 61 is 7.6 mm; in an preferred embodiment of third gear 60 of the present invention, the modulus of the third gear teeth 62 can be 0.4, the number of teeth of the third gear teeth 62 can be 53, the addendum circle of the third gear teeth 62 can be 21.72 mm, a tooth thickness of each of the third gear teeth 62 can be 3.8 mm; however, these examples are merely for exemplary illustration, and the application field of the present invention is not limited to these examples.

The output shaft component 70 is disposed in the accommodation space 13 of the chassis 10, and includes output gear teeth 71 and an output shaft 72. The output gear teeth 71 are engaged with the third shaft teeth 61, each of two ends of the output shaft 72 has a thread disposed thereon, a shaft of the output shaft 72 has a geometric star-shaped as shown in FIG. 1, but it is merely for schematic example, and the application field of the present invention is not limited. It should be noted that, in an embodiment of the present invention, a modulus of the output gear teeth 71 can be 0.6, the number of teeth of the output gear teeth 71 can be 48, an addendum circle of the output gear teeth 71 can be 29.82 mm, and a tooth thickness of each of the output gear teeth 71 can be 5.6 mm; however, these examples are merely for exemplary illustration, and the application field of the present invention is not limited to these examples.

With the configuration of a gear set constructed by the motor gear 22, the first gear 40, the second gear 50, the third gear 60 and the output shaft component 70, when the control circuit board 30 receives a control instruction with an output torque value from the external in-vehicle computer through the external port, the control circuit board 30 can control the motor 20 to make the output shaft component 70 reach output torque value. Common output torques of the output shaft component 70 can include 1.0 Nm, 1.2 Nm, and 1.4 Nm; however, these examples are merely for exemplary illustration, and the application field of the present invention is not limited to these examples. With the above-mentioned configuration, the actuator 100 of the present invention can provide a torque sufficient to drive the active grille shuttle in a limited accommodation space.

In a high-latitude environment, it is necessary to further consider the situation that the active grille shuttle may be frozen; therefore, with the configuration of the gear set constructed by the motor gear 22, the first gear 40, the second gear 50, the third gear 60 and the output shaft component 70, when the control circuit board 30 receives a control instruction with a freeze-breaking output torque value from the external in-vehicle computer through the external port, the control circuit board 30 can control the motor to make the output shaft component 70 instantly reach the freeze-breaking output torque value. The freeze-breaking output torque value of the output shaft component 70 can reach 2.2 Nm, but this example is merely for exemplary illustration, and the application field of the present invention is not limited to this example. Therefore, the actuator 100 of the present invention is able to provide a torque sufficient to drive the frozen active grille shuttle in the limited accommodation space.

The gear set constructed by the motor gear 22, the first gear 40, the second gear 50, the third gear 60, and the output shaft component 70 can provide a reduction ratio in a range of 600 to 650. It should be noted that, in a preferred embodiment, the gear set constructed by the motor gear 22, the first gear 40, the second gear 50, the third gear 60 and the output shaft component 70 can provide a reduction ratio of 613.078; however, these examples are merely for exemplary illustration, and the application field of the present invention is not limited to these examples.

Figure 4:
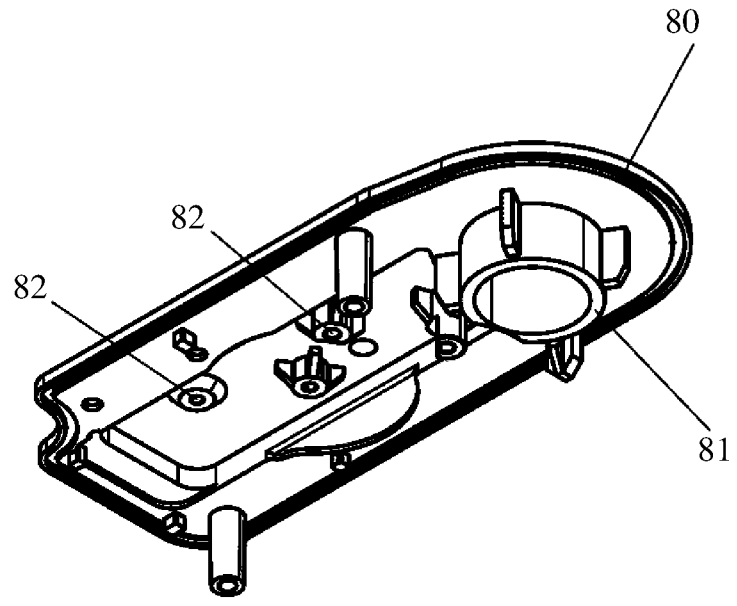
FIG. 4 is a perspective view of a lid of an actuator for an active grille shuttle, according to the present invention.

The lid 80 has a second output shaft hole 81, and multiple shaft holes 82 corresponding in position to the gear shafts 15, as shown in FIG. 4. FIG. 4 is a perspective view of a lid of an actuator for active grille shuttle, according to the present invention. The lid 80 covers to the chassis 10 by an engaging manner (this example is merely for exemplary illustration, and the application field of the present invention is not limited to these examples) to enclose the motor 20, the control circuit board 30, the first gear 40, the second gear 50, the third gear 60 and the output shaft component 70 in the accommodation space 13 of the chassis 10. The output shaft 72 is inserted through the first output shaft hole 12 and the second output shaft hole 81 to expose out of the chassis 10 and the lid 80.

Figure 5:
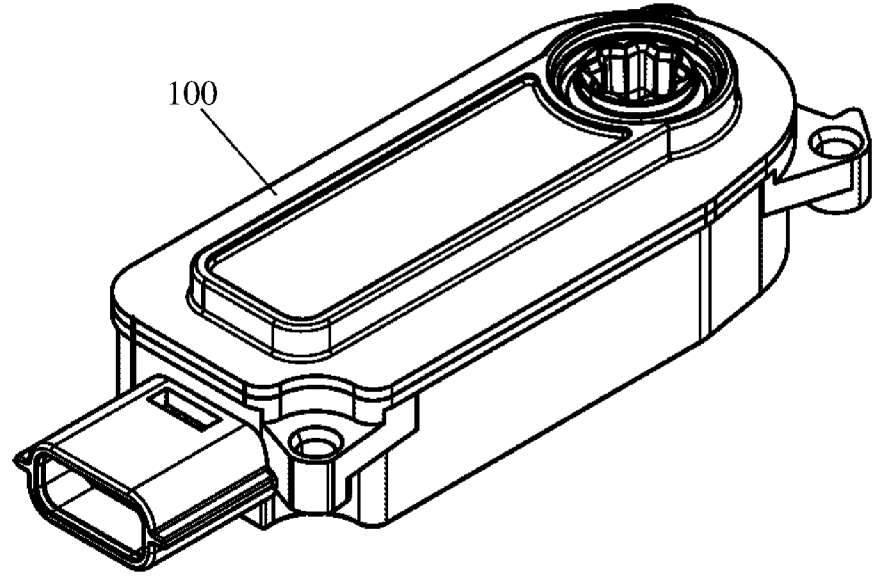
FIG. 5 is a perspective assembled view of an actuator for an active grille shuttle, according to the present invention.

The chassis 10, the motor 20, the control circuit board 30, the first gear 40, the second gear 50, the third gear 60, the output shaft component 70 and the lid 80 can form the actuator 100, as shown in FIG. 5. FIG. 5 is a perspective assembled view of an actuator for active grille shuttle, according to the present invention.

Figure 6:
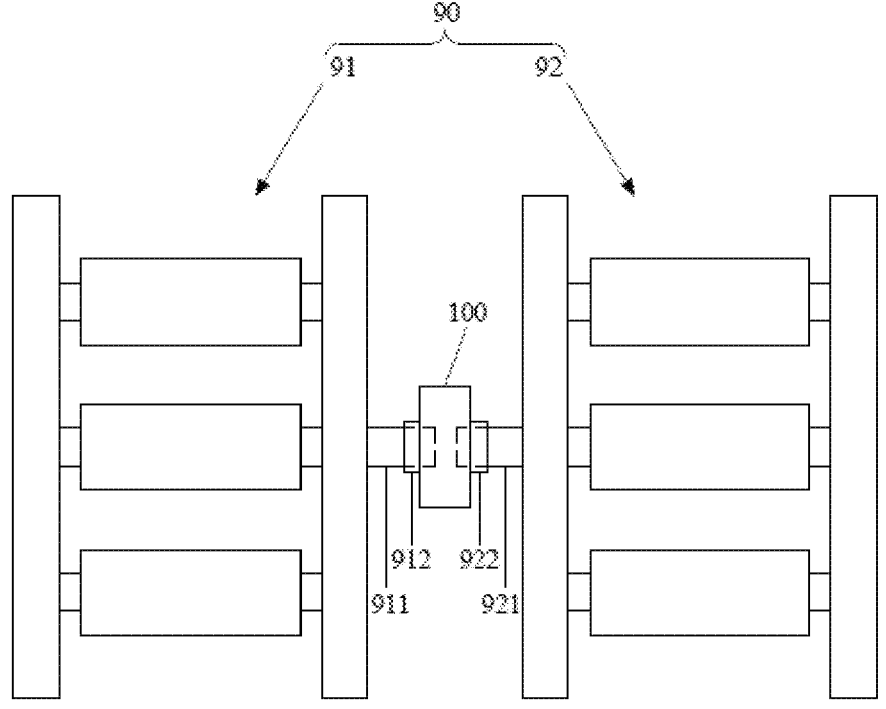
FIG. 6 is a schematic assembled plan view of an active grille shuttle and an actuator for the actuator for the active grille shuttle, according to the present invention.
Figure 7:
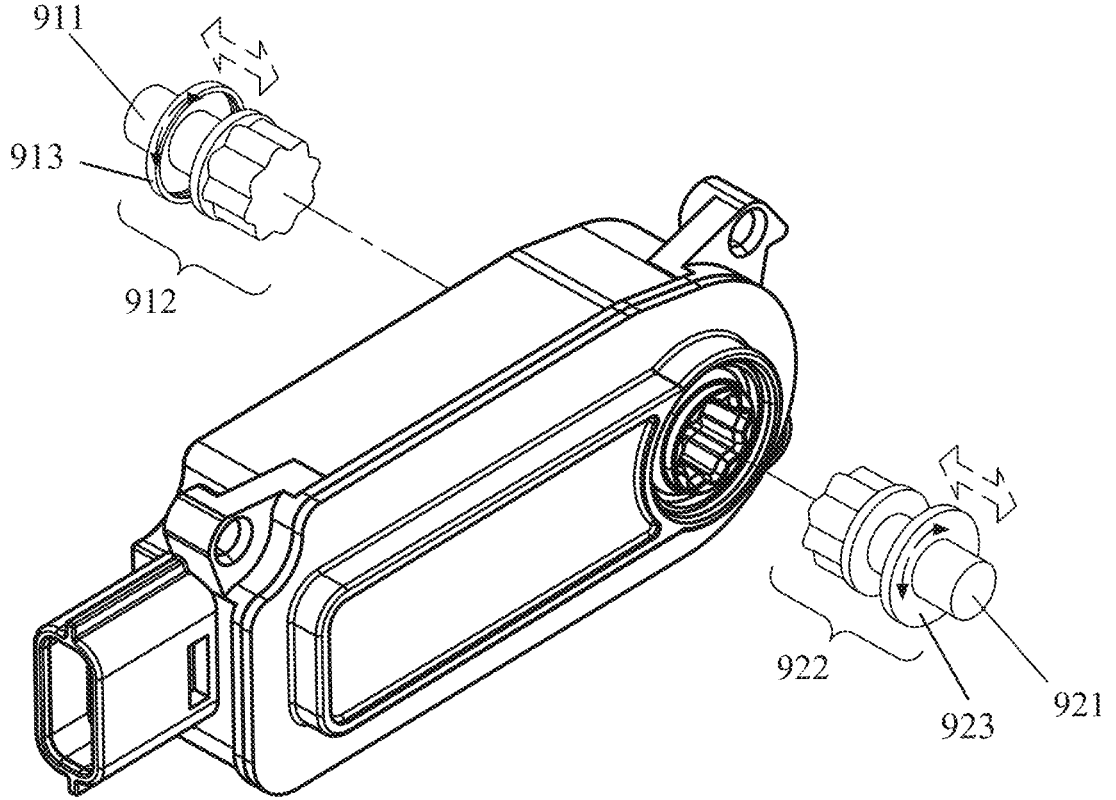
FIG. 7 is a perspective assembled process view of a mounting end of each of the linkage rods and an actuator for the actuator for an active grille shuttle, according to the present invention.

Please refer to FIG. 6 and FIG. 7, FIG. 6 is a schematic assembled plan view of an active grille shuttle and an actuator for the actuator for the active grille shuttle, according to the present invention, FIG. 7 is a perspective assembled process view of a mounting end of each of the linkage rods and an actuator for the actuator for an active grille shuttle, according to the present invention. The active grille shuttle 90 includes two grille shuttles 91, 92, each of the two grille shuttles 91, 92 is linked with a linkage rod 911, 921, a mounting end 912, 922 of each of the linkage rods 911, 921 has a geometric star-shaped corresponding in concave-convex the geometric star-shaped to interior of the shaft of the output shaft 72, each of the linkage rods 911, 921 of the active grille shuttle 90 is inserted in an end of the output shaft 72 based on the geometric star-shaped of the mounting end 912, 922 and the geometric star-shaped of interior of the shaft of the output shaft 72 respectively, so that each of the linkage rods 911, 921 of the active grille shuttle 90 is interlocked with the each of two ends of the output shaft 72 respectively. Two locking elements 913, 923 are set through the mounting end 912, 922 of each of the linkage rods 911, 921 respectively and the locking elements 913, 923 can move left and right relative to the mounting end 912, 922 of each of the linkage rods 911, 921 and rotate relative to the mounting end 912, 922 of each of the linkage rods 911, 921, wherein each of the locking elements 913, 923 have an internal thread disposed interior, and then each of locking elements 913, 923 of the linkage rods 911, 921 of the active grille shuttle 90 are respectively screwed to each of the two ends of the output shaft 72 through the internal thread in locking elements 913, 923 and the thread on each of the two ends of the output shaft 72. When the actuator 100 drives the output shaft component 70 to rotate through the motor 20, the first gear 40, the second gear 50, and the third gear 60, the grille shuttles on the two sides of the active grille shuttle are driven at the same time to adjust the opening magnitude of the grille shuttles or close the grille shuttles.

According to the above-mentioned configuration of the present invention, the linkage rod is interlocked and screwed with the output shaft 72 through the thread on the output shaft 72, the linkage rod contacts the thread of the output shaft 72 over multiple areas, so a large amount of friction force can be formed to make the linkage rod and the output shaft 72 fasten with each other to form an overall structure; when the output shaft 72 drives the linkage rod to rotate, the linkage rod and the output shaft 72 are treated as a whole to rotate, thereby reducing the frictional loss of the mounting parts of the linkage rod and the output shaft 72.

Compared with the conventional technology, the actuator of the present invention, the linkage rods of the active grille shuttle are interlocked and screwed with an output shaft to drive the active grille shuttle, to solve a conventional technical problem that opening and closing control accuracy of the active grille shuttle is gradually reduced over time because an output shaft of a conventional actuator and linkage rods of an active grille shuttle are worn after long-term use when the linkage rods are mounted with the output shaft of the conventional actuator by fitting shapes. Compared with the conventional actuator, the output shaft of the disclosed actuator and the linkage rods of the active grille shuttle are not worn due to long-term use, so as to achieve the effect of improving accuracy and stability of the opening and closing control of the active grille shuttle.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An actuator for an active grille shuttle, comprising:
a chassis, comprising external connecting parts, a first output shaft hole, multiple gear shafts, and an accommodation space, wherein the gear shafts are single-piece construction with the chassis;
a motor, disposed in the accommodation space, and having a motor rotor provided to connect and fix a motor gear, wherein a modulus of the motor gear is 0.3;
a control circuit board, comprising an external port, wherein the control circuit board is electrically connected to and disposed on the motor, multiple pins of the external port are inserted through the external connecting parts, and the control circuit board receives a control instruction from an external in-vehicle computer, to control the motor to rotate;
a first gear, disposed in the accommodation space, and comprising first shaft teeth and first gear teeth, wherein the first gear teeth are engaged with the motor gear, wherein a modulus of the first shaft teeth is 0.35 and a modulus of the first gear teeth is 0.3;
a second gear, disposed in the accommodation space, and comprising second shaft teeth and second gear teeth, wherein the second gear teeth is engaged with the first shaft teeth, wherein a modulus of the second shaft teeth is 0.4 and a modulus of the second gear teeth is 0.35;
a third gear, disposed in the accommodation space, and comprising third shaft teeth and third gear teeth, wherein the third gear teeth are engaged with the second shaft teeth, wherein a modulus of the third shaft teeth is 0.6 and a modulus of the third gear teeth is 0.4;
an output shaft component, disposed in the accommodation space, and comprising output gear teeth and an output shaft, wherein the output gear teeth are engaged with the third shaft teeth, each of two ends of the output shaft has a thread disposed thereon, and interior of a shaft of the output shaft has a geometrical star-shaped, wherein a modulus of the output gear teeth is 0.6; and
a lid, comprising a second output shaft hole, wherein the lid is configured to cover the chassis to enclose the motor, the control circuit board, the first gear, the second gear, the third gear and the output shaft component in the accommodation space, and the output shaft is inserted through the first output shaft hole and the second output shaft hole to expose out of the chassis and the lid;
wherein a combination of the motor gear, the first gear, the second gear, the third gear and the output shaft component has a reduction ratio in a range of 600 to 650, the active grille shuttle comprises two grille shuttles, each of the two grille shuttles is linked with a linkage rod corresponding thereto, a mounting end of each of the linkage rods has a geometric star-shaped corresponding in the geometric star-shaped to interior of the shaft of the output shaft, each of the linkage rods of the active grille shuttle is interlocked with an each of two ends of the output shaft based on the geometric star-shaped of the mounting end and the geometric star-shaped of interior of the shaft of the output shaft respectively, and then each of the linkage rods of the active grille shuttle are respectively screwed to each of the two ends of the output shaft through the thread on each of the two ends of the output shaft, when the actuator drives the output shaft component to rotate through the motor, the first gear, the second gear, and the third gear, the grille shuttles on two sides of the active grille shuttle are driven at the same time to act, to adjust opening magnitudes of the grille shuttles on two sides of the active grille shuttle or close the grille shuttles on two sides of the active grille shuttle.

2. The actuator for active grille shuttle according to claim 1, wherein the chassis comprises multiple fastening parts disposed an outer surface thereof, and the actuator is fastened with the active grille shuttle through the multiple fastening parts.

3. The actuator for active grille shuttle according to claim 1, wherein each of the first gear, the second gear and the third gear is inserted through a corresponding one of the multiple gear shafts, and the first gear, the second gear, and the third gear are disposed in the accommodation space.

4. The actuator for active grille shuttle according to claim 1, wherein the control circuit board receives a control instruction with an output torque value from the external in-vehicle computer through the external port, and controls the motor to make the output shaft component reach the output torque value.

5. The actuator for active grille shuttle according to claim 1, wherein the control circuit board receives a control instruction with a freeze-breaking output torque value from the external in-vehicle computer through the external port, and controls the motor to make the output shaft component instantly reach the freeze-breaking output torque value.

6. The actuator for active grille shuttle according to claim 1, wherein the control circuit board has a hole, and the motor gear is inserted through the control circuit board through the hole to engage with the first gear teeth.

* * * * *